US012589319B2

(12) United States Patent
Bagnariol

(10) Patent No.: US 12,589,319 B2
(45) Date of Patent: Mar. 31, 2026

(54) SYSTEM AND METHOD FOR CONTROLLING A PLURALITY OF KARTS IMPLEMENTING AT LEAST TWO COMMUNICATION NETWORKS

(71) Applicant: SODIKART, Coueron (FR)

(72) Inventor: Gilles Bagnariol, Nantes (FR)

(73) Assignee: SODIKART, Coueron (FR)

( * ) Notice: Subject to any disclaimer, the term of this patent is extended or adjusted under 35 U.S.C. 154(b) by 465 days.

(21) Appl. No.: 17/629,642

(22) PCT Filed: Jul. 24, 2020

(86) PCT No.: PCT/EP2020/071043
§ 371 (c)(1),
(2) Date: Jan. 24, 2022

(87) PCT Pub. No.: WO2021/014018
PCT Pub. Date: Jan. 28, 2021

(65) Prior Publication Data
US 2022/0241696 A1 Aug. 4, 2022

(30) Foreign Application Priority Data

Jul. 24, 2019 (FR) ...................................... 1908416

(51) Int. Cl.
*A63G 25/00* (2006.01)
*G05D 1/00* (2024.01)
(52) U.S. Cl.
CPC ........... *A63G 25/00* (2013.01); *G05D 1/0297* (2013.01)
(58) Field of Classification Search
CPC .... A63G 25/00; G05D 1/0297; A63F 13/216; A63F 13/803; A63F 13/27; G06Q 50/10; H04W 4/029; H04W 4/40
See application file for complete search history.

(56) References Cited

U.S. PATENT DOCUMENTS 9,880,731 B1 * 1/2018 Wang ...................... G06F 1/163
10,733,894 B1 * 8/2020 Beard .................. G05D 1/0022
(Continued)

FOREIGN PATENT DOCUMENTS

CN 107770248 A 3/2018
EP 1198274 4/2002
(Continued)

OTHER PUBLICATIONS

English Translation of JP2013210963A (Year: 2024).*
(Continued)

*Primary Examiner* — Hitesh Patel
*Assistant Examiner* — Shahira Baajour
(74) *Attorney, Agent, or Firm* — David D. Brush; Westman, Champlin & Koehler, P.A.

(57) ABSTRACT

A system for controlling a plurality of karts distributed over a karting track, implementing a control server communicating with each of the karts using at least two separate communication networks, a first safety information management network and a second gaming information management network. The first safety information network also allows transmitting requests for action from one of the karts to the server. The server is configured to manage respective positions of the karts, analyze the requests according to the respective positions and to validate, refuse, modify and/or delay the activation of the requests, by emitting corresponding commands to the concerned karts, via the first network, and synchronize controlling according to the requests. The server generates image data at least to the concerned karts, and generates special effects by controlling light and/or sound sources provided for this purpose on the karting track, to simulate the activation of the requests.

21 Claims, 6 Drawing Sheets

(56)  References Cited

U.S. PATENT DOCUMENTS

2002/0067293 A1 *  6/2002  Urushidani ............ G01S 13/74
                                                        340/988
2006/0223637 A1    10/2006  Rosenberg
2014/0365194 A1 * 12/2014  O'Hagan .............. G05B 15/02
                                                        703/11

FOREIGN PATENT DOCUMENTS

FR          3008944 A1     1/2015
FR          3079389 A1    10/2019
JP       2013210963 A  * 10/2013
WO          0105476 A1     1/2001
WO       2019010411 A1     1/2019

OTHER PUBLICATIONS

International Search Report dated Oct. 15, 2020 for corresponding
International Application No. PCT/EP2020/071043, Jul. 24, 2020.
Written Opinion of the International Searching Authority dated Oct.
15, 2020 for corresponding International Application No. PCT/
EP2020/071043, filed Jul. 24, 2020.
French Search Report and Written Opinion dated Jun. 8, 2020 for
corresponding French Application No. 1908416, filed Jul. 24, 2019.
English translation of the Written Opinion of the International
Searching Authority dated Nov. 26, 2020 for corresponding Inter-
national Application No. PCT/EP2020/071043, filed Jul. 24, 2020.

* cited by examiner

SYSTEM AND METHOD FOR CONTROLLING A PLURALITY OF KARTS IMPLEMENTING AT LEAST TWO COMMUNICATION NETWORKS

CROSS-REFERENCE TO RELATED APPLICATIONS

This Application is a Section 371 National Stage Application of International Application No. PCT/EP2020/071043, filed Jul. 24, 2020, which is incorporated by reference in its entirety and published as WO 2021/014018 A1 on Jan. 28, 2021, not in English.

1. FIELD OF THE INVENTION

The field of the invention is that of karting, and more precisely of gaming, or "enhanced", practice compared to usual practice.

2. PRIOR ART

The practice of karting has existed for several decades. A kart is a very simple vehicle, generally based on a tubular chassis without suspension, essentially carrying a motorisation, a seat for the driver, a steering wheel to control the direction, and a crankset, comprising an accelerator pedal and a brake pedal. The motorisation can in particular be thermal or electric.

The practice of karting is done on a track, outdoors or, according to an approach that has developed strongly, indoors.

It is possible to distinguish competition karting and leisure karting, which is most often done by rental of karts (for example for a series of laps over a period of 10 or 15 minutes), or in the form of animations, for example over a half-day or an evening, which can bring together a group of friends, office colleagues, etc. Usually karting is done in the form of one or more races on the karting track. The users, or drivers, each drive a kart, and race, generally for several laps of the track, the objective being of course for the driver to be the fastest, and therefore the first to cross the finish line.

This competitive approach, whether implemented as part of a real sports competition on competition karts or with friends on rental karts, satisfies many practitioners. However, there is a desire to expand the number of practitioners and to offer other approaches, in addition.

Games ("Mario Kart" (registered trademark) for example) wherein the players do not limit themselves only to a driving simulation: they can obtain bonuses, for example by driving on an object appearing on the track, which will give them an increase in speed, for some time, are known in the field of video games. They can also, sometimes, aim at another kart, to make it slow down or go off the track. It is understood that it could be interesting to offer similar enhancements in certain cases and for certain audiences with real karts, to combine the reality of driving with the gaming aspect.

However, implementing such an approach is not easy in practice, and it turns out that no effective and reliable solution has been able to be proposed. The main problem for adapting known approaches in the field of video games to real karting is that of the safety of the drivers, and, where appropriate, of the audience. Indeed, it does not matter, in a virtual situation, that is to say in a game, if one of the karts is damaged or even destroyed. On the contrary, it is generally part of the game and of player satisfaction. And this does not pose a problem, since the kart, or another vehicle, is generally returned "as new" after a few seconds and that, in any event, there has been no material destruction or actual damage, nor of course physical endangerment of drivers. Obviously, this is not the case with real karts, and it is essential to guarantee the safety of the drivers and the audience, and, as much as possible, the integrity of the karts and the track. It is therefore not possible to allow a kart to go off the track following a gaming action by another driver, nor for two or more karts to collide because one has been forced to slow down and/or the other could strongly accelerate thanks to a temporary "boost" effect.

It is therefore essential to have the means to remotely control the karts, in particular to interact with them when a risky situation arises.

It is important to remember here that karts are vehicles that move relatively quickly, including when it comes to rental karts, and that they quickly reach several tens of kilometres per hour, for example 50 or 60 km/h. To be significant, a "boost" effect should therefore add, for example, at least 10 km/h, which introduces a speed differential between the different karts that can generate risky situations.

Moreover, karts are basic vehicles, based on a simple chassis, light and relatively inexpensive. It is not possible, of course, to equip them like a motor vehicle with anti-collision detection means and more generally with techniques currently being developed for future autonomous or semi-autonomous vehicles. However, it would be necessary for them to have, at a lower cost and at reduced weight, the means allowing the driver to be informed and participate in the gaming aspects, for example to know if he has a reserve of energy allowing him to activate a "boost" effect, or if it has been hit by the (virtual) shooting of another driver, causing him to slow down.

The implementation of all these aspects is particularly complex, in particular, taking into account the double consideration of a need for safety (it is of course understood, that if it is necessary to stop or slow down a kart, the signal must not be transmitted late and/or not received, or poorly received) and for optimisation of the costs of development and installation on a karting track, which may be open ("indoor") or outdoor.

Techniques are also known, for example from document WO2019010411, allowing virtual vehicles to participate virtually in a real race, among real vehicles competing in this real race. But this document does not provide any particular solution to the safety of the transmission of commands acting on these real vehicles, and in particular on a way of managing their power or other elements that may interact with the behaviour of the vehicle, and even less of a kart, nor to the management of the associated gaming aspect. The aim of the invention is in particular to overcome at least some disadvantages.

3. DESCRIPTION OF THE INVENTION

These objectives, as well as others which will appear more clearly below, are achieved using a system for controlling a plurality of karts distributed over a karting track, implementing a control server powered by means for locating each of said karts.

According to the invention, said server communicates with each of said karts using at least two separate communication networks, a first safety information management network, allowing to transmit commands acting on the control of the motorisation of at least one kart according to a first secure radio protocol, and a second gaming information management network, allowing to transmit image data to a screen mounted on each of said karts according to a second protocol.

Said server comprises:

means for managing the respective positions of each of the karts, provided by said locating means, and means for analysing action requests emitted by said karts, comprising at least requests for increasing and/or reducing power, according to said respective positions, capable of validating, refusing, modifying and/or delaying the activation of said requests, by emitting corresponding commands to the concerned karts, via said first network, and synchronisation means controlling according to said action requests; and means for generating image data at least to said concerned karts, illustrating the activation of said action requests, via said second network.

Thus, according to the invention, it is possible to offer improvements, or enhancements, which are fun, compared to the usual practice of karting, without compromising safety. Indeed, specific means, including a dedicated network, are provided to generate and transmit commands to stop or slow down certain karts. In parallel, the server produces images, or information allowing to construct images, which are reproduced on screens mounted on the karts. Transmission is provided by a second network which does not interfere with the transmission of safety information.

It should be noted that, for a gaming, but also sporty implementation, the speed variations should preferably be significant (at least 10 km/h). This requires an implementation guaranteeing the safety of the drivers, by a precise analysis and a very efficient transmission of the commands by the first network. According to a first particular embodiment, said locating means implement a third communication network with said server, implementing an Ultra Wide Band type communication.

Thus, the server takes into account and/or controls the information transmitted via three separate networks, so as to optimise the safety of the drivers, by having on the one hand a precise location, via the third network, and effective remote control of the karts, via the second network. The distinction between the different networks allows to optimise the processing of each type of information, and to avoid transmission anomalies.

According to a particular implementation, said first protocol implements a communication on a first frequency of the ISM band.

In this case, according to one embodiment, said action requests can be transmitted via said first network also allows transmission, on a second frequency of the ISM band.

According to a particular embodiment, said second protocol is a Wi-Fi protocol.

This Wi-Fi network allows simple and efficient transmission, which is well adapted to screens equipping karts.

Said image data can in particular be reproduced on a screen mounted on the steering wheel, for example a removable screen, in the form of a smartphone.

This allows a particularly simple and efficient implementation. Smartphones are inexpensive and adapted for Wi-Fi communication. It is moreover easy to remove such telephones from the steering wheel, and to charge them. It can also be tablets, or the like.

According to a particular embodiment, said server comprises means for generating special effects, controlling light and/or sound means provided for this purpose on said karting track, to simulate the activation of said requests.

The server thus provides, in a manner which is synchronised with the commands, special effects, which can in particular be activated via data delivered by the second network.

According to a particular embodiment, said requests comprise on the one hand requests for a temporary increase in the power of the kart emitting the request and on the other hand requests for a temporary reduction of the power of a kart neighbouring the emitter kart, transmitted via said first network.

The requests generated by the karts are thus transmitted via the network reserved for safety. Indeed, such requests, whether they are requests for a temporary increase in power, for the emitter kart or requests for a temporary power limitation, for a competing kart, involve safety considerations, since the implementation of said requests will influence the behaviour of the karts on the track.

In this case, said analysis means can in particular validate, refuse, modify and/or delay the activation of a request according to a plurality of criteria comprising:

the position of said emitter kart and/or of said neighbouring kart on said track, so as to avoid in particular a change in power in a dangerous zone of said track;

the position of said emitter kart and/or said neighbouring kart relative to all the nearby karts;

the orientation, speed and/or acceleration of said emitter kart and/or said neighbouring kart relative to said track;

the orientation, speed and/or acceleration of said emitter kart and/or said neighbouring kart in relation to all the nearby karts;

information on the possibility of activating said request, according to a set of rules for loading an availability counter.

This different information can, for example, be in the form of vectors with several dimensions. The analysis of such vectors can involve comparisons, correlations, systems of equations, etc., able to provide effective decisions in matters of safety.

The system can furthermore also take into account orientation, speed and/or reference acceleration, pre-recorded by said server.

Thus, the processing does not take into account only the different karts present on the track, but also reference information, corresponding for example to a reference kart, allowing the server to compare the situation of a real kart with a reference, knowing what is possible, reasonable and/or impossible, for example maximum speed in a turn.

According to one particular aspect, said requests for the temporary reduction of the power of a kart neighbouring the emitter kart may in particular correspond to the sending of a fictitious missile by the emitter kart, the sending and/or impact of which are illustrated by said means for generating special effects.

One of the gaming aspects allowed by the invention is indeed to simulate shooting (or the sending of a special effect or a "spell", included here in the term "missile") to another kart. This leads, if successful, to a slowing effect (and/or other disturbance) on the target kart. This success is conveyed by the effect applied to the affected kart, but also by special effects, allowing spectators to see this effect.

Corresponding information can also be transmitted, via the second network, on the screen of the affected kart, to indicate for example the impact, the time remaining for the effect and/or the identification of the shooter . . . , and/or on the screen of the shooter kart, for example to indicate the success of the firing and/or the quantity of ammunition remaining . . . Corresponding information can also be broadcast to other karts, for example to indicate that one of the neighbouring karts is going to accelerate or slow down.

According to a first implementation, said server applies said impact to the kart preceding the closest emitter kart.

In this case, the shots are validated automatically, even if the targeted kart (in practice, the closest kart) is moving and/or is not in the path. The missile behaves like a "homing" missile. It is the server who determines the target kart, taking into account the respective distances between the karts.

According to another implementation, said server determines a trajectory of said fictitious missile depending on the position and orientation of said emitter kart and the existence or not of an impact on a kart preceding said emitter kart, depending on the position, orientation, speed and/or distance of said previous kart.

According to this variant, the server calculates an attitude for the shooting, and determines whether or not the shooting is effective. It can in particular implement a determination of a shooting vector.

In one embodiment, said emitter kart further comprises means for modifying the attitude of a missile strike, relative to the orientation of said emitter kart (that is to say that it does not aim systematically straight ahead).

It is thus possible to direct the shooting at a target kart, regardless of the orientation of the kart.

This is in particular well adapted to the case of a two-seater kart, the shooter may be the passenger, separate from the driver. Thus, when said emitter kart is a two-seater kart, carrying a driver and a passenger, said means for modifying the attitude of a missile strike can be manipulated by said passenger. The shooter can also be present on the kart virtually, and act from a position comprising a screen and shooting means, interacting with the server. More generally, interveners, in particular teammates or opponents, can intervene outside the karts, from fixed stations with screens providing the view from a kart.

In a particular implementation, said impact varies in intensity according to a number of successive requests generated by said emitter kart within a predetermined period of time.

For example, the server can order a gradual slowdown of the kart: each time the kart is affected, its speed slows down a bit. It is therefore necessary to repeat the shooting to make it slow down significantly.

According to a second particular embodiment, the driver of at least one of said karts is equipped with virtual reality means (glasses, headset, etc.), supplied via said second gaming information management network.

According to this variant, it is expected that the drivers (or at least some of them) do not see the reality of the track, but a virtual situation, both with regard to the environment (track, environment, special effects, etc.) and other karts (which can for example be represented by a single-seater, a spaceship, or any other type of vehicle, etc.). It is possible that the rendered environments are different depending on the choices of the drivers.

In this embodiment, the driver does not see the track, but a virtual version of it. The track can therefore be virtual (which allows to vary it) or real, at least partially. However, the situation is very different from a virtual game, on the one hand because the karts operate in a real and predefined space, and on the other hand because it is essential to manage the safety of the drivers, taking into account not only the movement of the kart considered but also the movements of other karts, to avoid collisions. This is enabled by the use of a first network, dedicated to safety.

In this embodiment in particular, provision may be made for said virtual reality means to comprise means for locating the corresponding kart, cooperating with means for transmitting said location information via said second gaming information management network.

Virtual reality devices can indeed be equipped with localisation means, allowing efficient processing. The location can take into account on the one hand the location of the kart and on the other hand that of the device, so as to take into account not only the evolution features of the kart (orientation, speed, acceleration, etc.), but also the direction of the driver's gaze.

According to one particular feature, said server can further comprise means for constructing a virtual image of said track, and means for transmitting said virtual image to at least one screen intended for spectators or players.

Thus, it is possible, for the spectators, to follow the race, on a representation of the track, with representation of the effects of the commands.

Said server can also comprise, and/or drive, interactivity means, allowing a spectator to emit requests able to act on at least one of said karts.

According to this approach, one or more spectators (or a member of a team to which at least one driver belongs) can interact, granting advantages or difficulties to a kart.

Such a method can in particular implement the following steps, in a management server:

determining the position of each of said karts;

emitting commands acting on the control of the motorisation of at least one kart via said first safety information management network implementing a secure radio protocol;

receiving requests for action from one of said karts, including at least requests for a temporary increase in the power of said kart and requests for a temporary reduction of the power of another kart;

analysing said requests according to said respective positions, so as to validate, refuse, modify and/or delay the activation of said requests;

emitting commands corresponding to said activation which is validated, refused, modified and/or delayed to the concerned karts, via said first network;

generating image data at least to the concerned karts, illustrating the activation of said requests;

emitting said image data via said second network, to display said images on said screen of said concerned karts.

In particular, this method can comprise, by implementing certain features mentioned above, the following steps:

determining the position of each of said karts;

emitting commands acting on the control of the motorisation of at least one kart via said first safety information management network implementing a secure radio protocol, on a first frequency of the ISM band, receiving requests for action from one of said karts including at least requests for a temporary increase in the power of said kart and requests for a temporary reduction of the power of another kart, via said first network, on a second frequency of the ISM band;

analysing said requests according to said respective positions, so as to validate, refuse, modify and/or delay the activation of said requests;

emitting commands corresponding to said activation which is validated, refused, modified and/or delayed to the concerned karts, via said first network;

generating image data at least to said concerned karts, illustrating the activation of said requests;

transmitting said image data via said second network;

generating special effects, controlling light and/or sound means provided for this purpose on said karting track, to simulate the activation of said requests;

synchronising, according to said validated, refused, modified and/or delayed activations, said steps of emitting image data and generating special effects.

According to this approach, an enhanced, in particular gaming management, of the implementation of the karts on the track, while guaranteeing the safety of the karts and their drivers, is obtained.

4. DESCRIPTION OF THE FIGURES

Other features of the invention will emerge more clearly upon reading the following description of preferred embodiments of the invention, given by way of simple illustrative and non-limiting examples, and the appended figures, among which:

Figure 3:
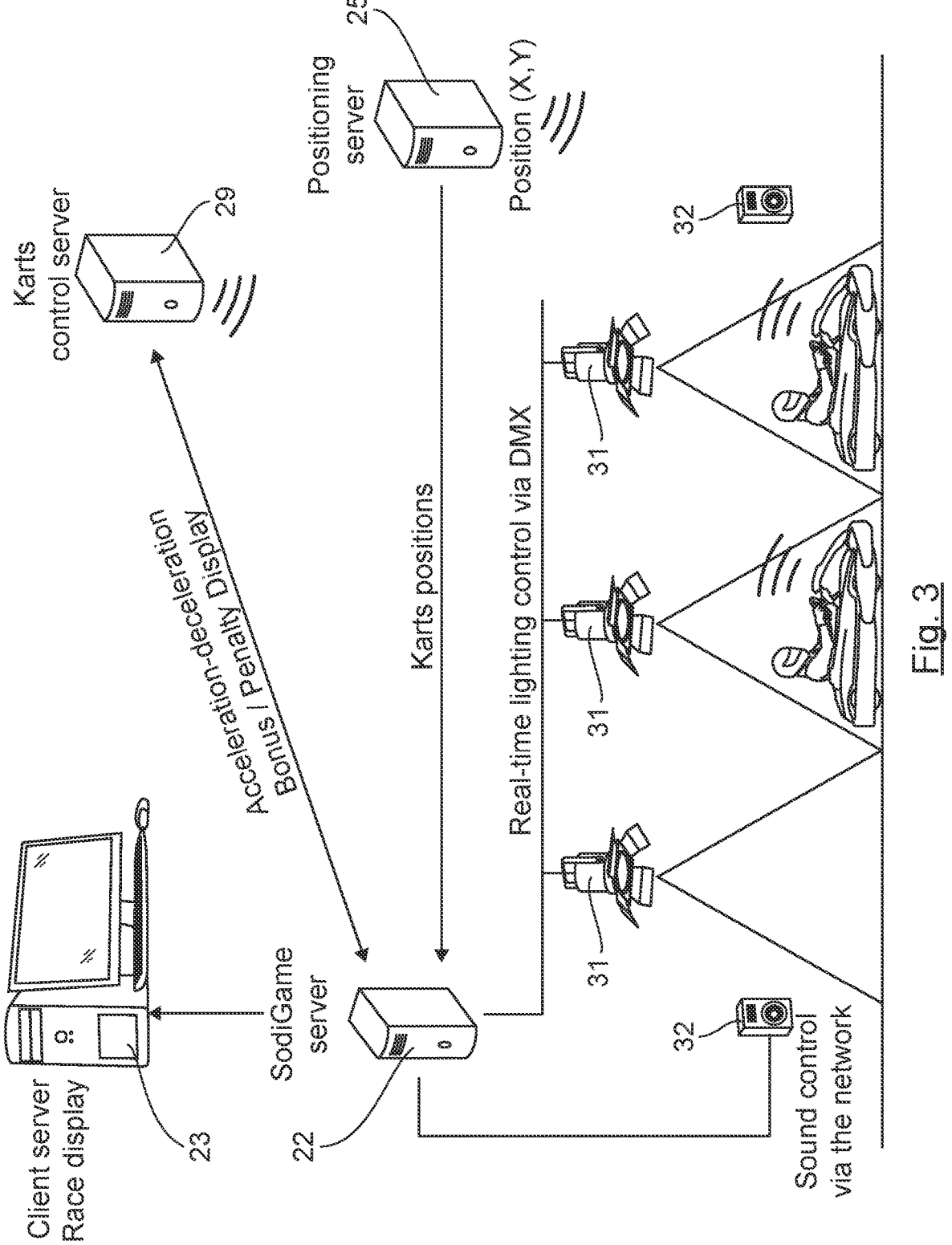
Figure 4:
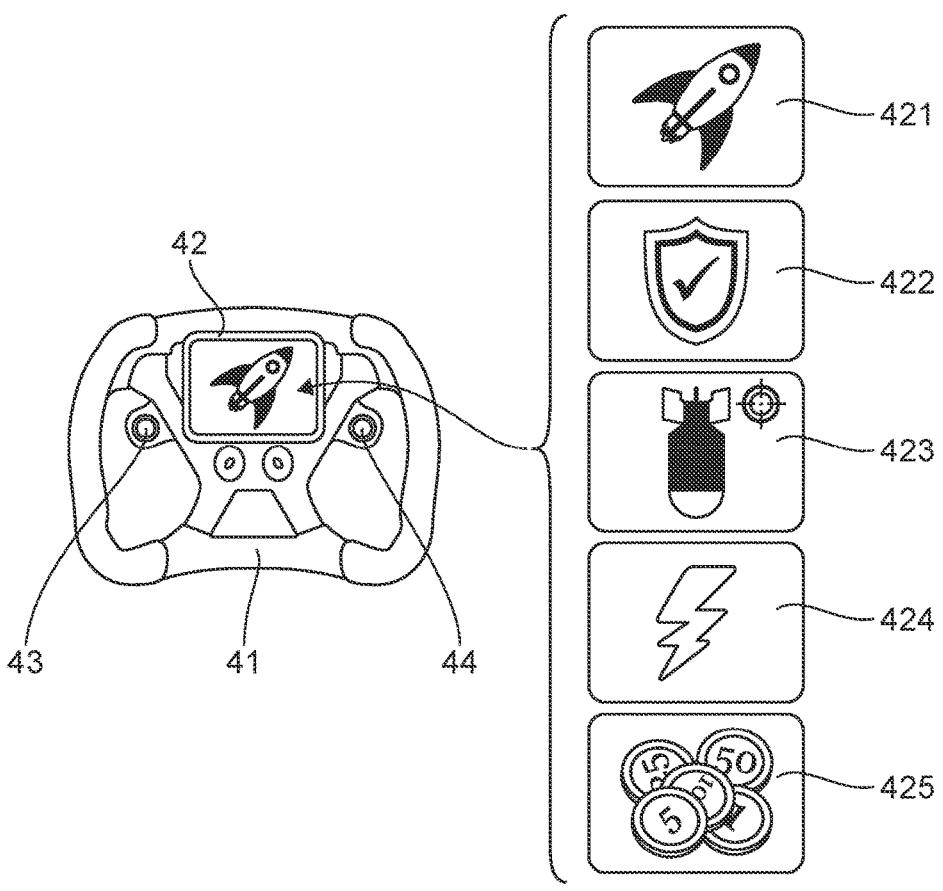
Figure 5:
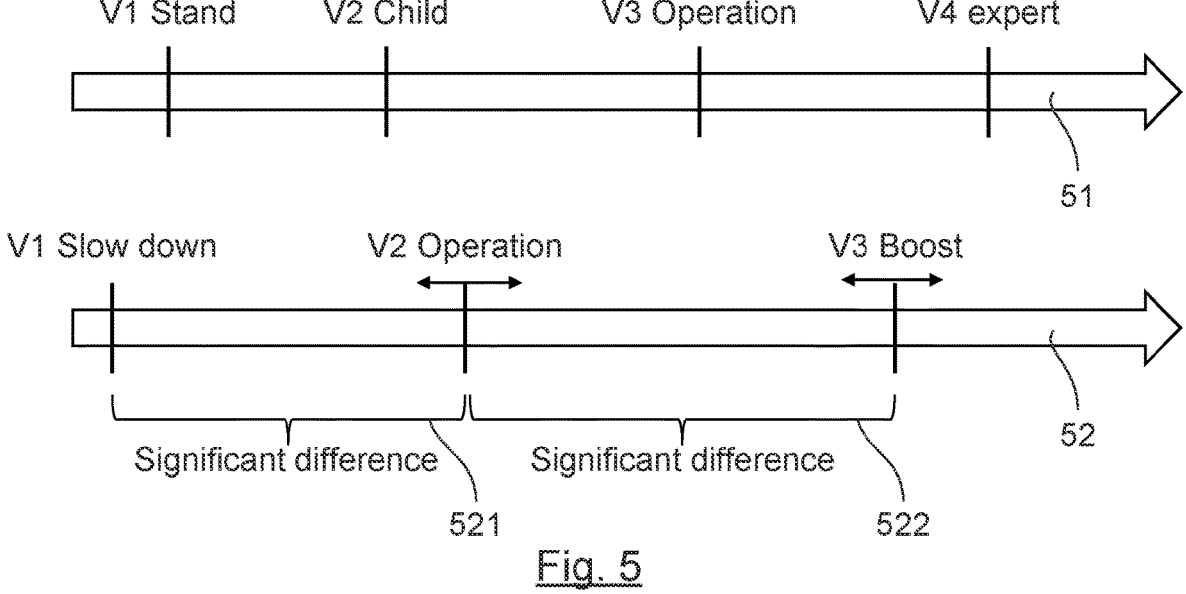
Figure 6:
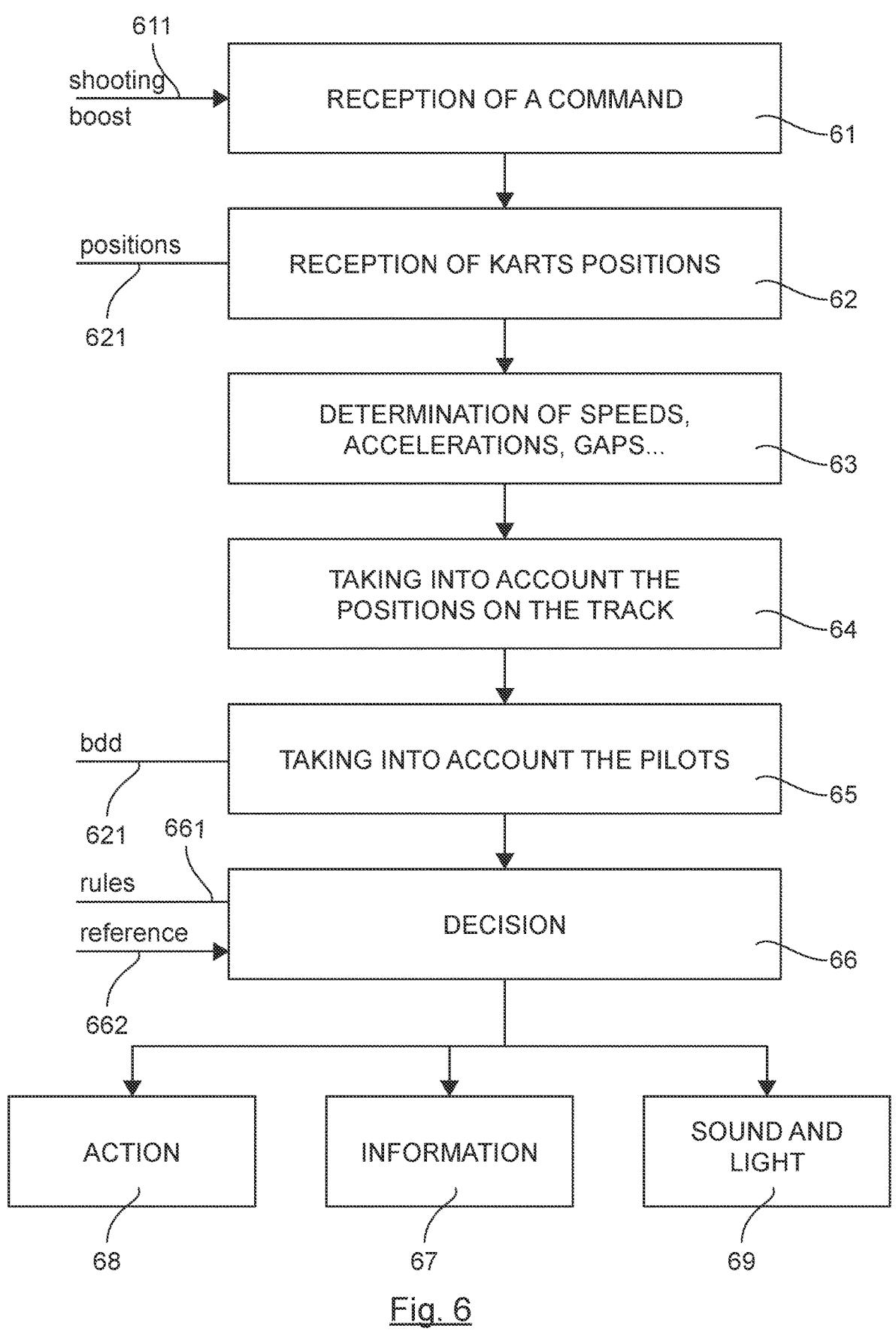
Figure 7:
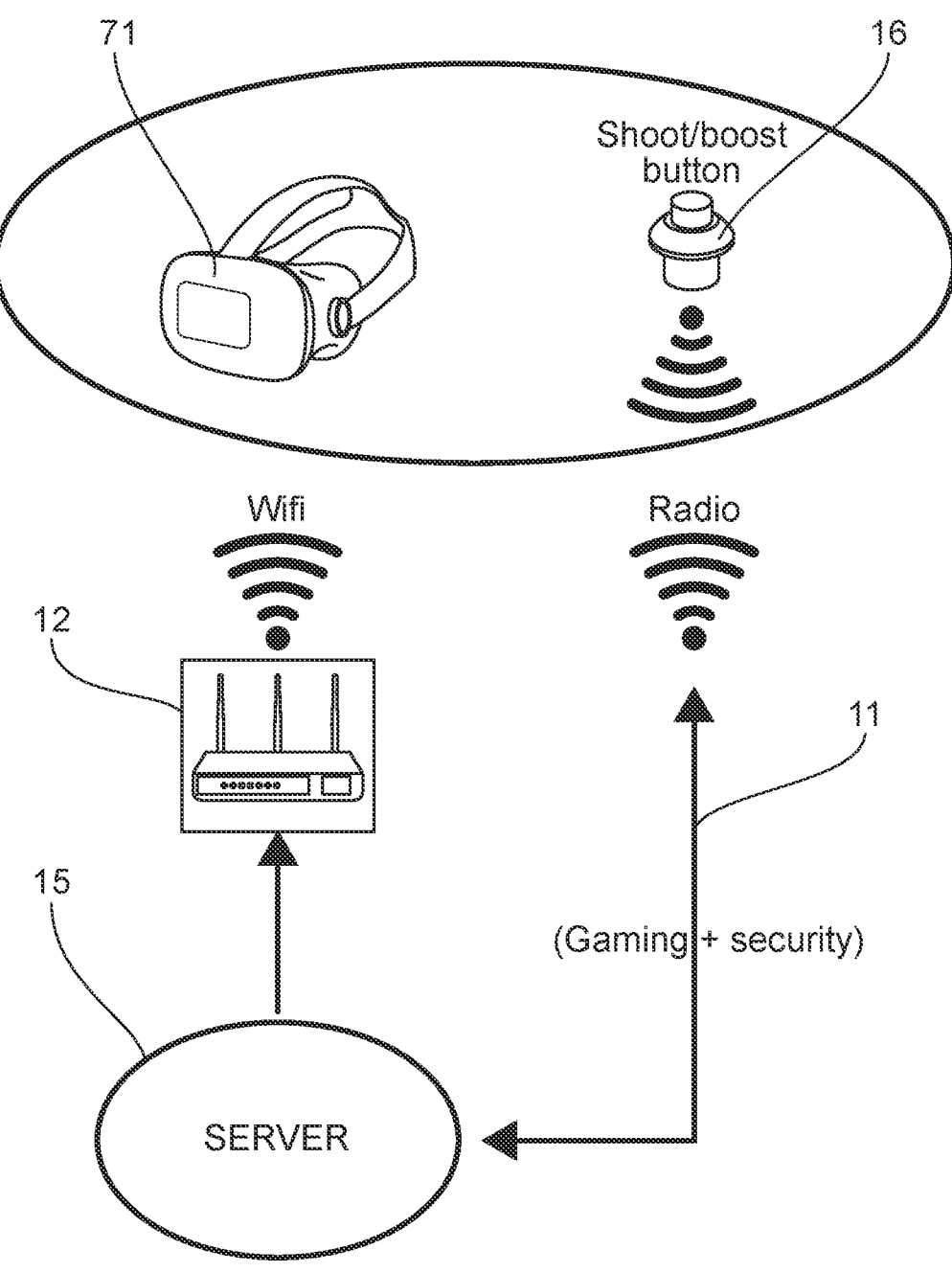

FIG. 3 schematically illustrates the management of the "sound and light" aspects of the track;

FIG. 4 illustrates examples of gaming aspects that can be implemented according to the invention;

FIG. 5 shows an example of speed deviations, requiring the implementation of appropriate safety;

FIG. 6 schematically illustrates a method that can be implemented to manage a system according to the invention;

FIG. 7 is a schematic view of the communication and data exchange networks implemented according to a second approach of the invention.

5. DETAILED DESCRIPTION OF AN EMBODIMENT

5.1 General Aspects

The invention proposes a new approach to karting and more specifically an enhancement of this activity, by offering the drivers, and where appropriate the spectators, new tools and new sensations, compared to the conventional practice of karting, in a safe manner.

As mentioned in the preamble, adaptations have already been considered to enhance the practice of karting, in particular by drawing inspiration from video games. For example, the holder of the present patent application proposed, in patent document FR1852834 (unpublished), to implement augmented reality means specifically adapted to karting are proposed, based on a particular headset, the visor of which provides, in addition to its protective function, a projection screen function, onto which information can be projected, in augmented reality, that is to say in superposition of the real elements seen by the driver.

In practice, and despite the solutions considered in this document, it appears that the safety of the drivers may, in some cases, not be guaranteed in an optimum manner. Indeed, the management of gaming aspects, whether via an augmented reality headset or via other approaches, described below, requires the transfer of a high amount of information, which can be detrimental to the management of safety, which requires both immediate reactions (for example to stop a kart or all karts, in the event of danger) and reliable transmissions and some of the corresponding commands. The speed of karts, even when they are rental karts, is significant, and the danger is therefore potentially high.

Moreover, the transmission of this high amount of information must be done in a simple and inexpensive way, the equipment of the karting tracks not allowing the development of a specific protocol for this application, and the karts not allowing the installation of dedicated electronic means. Indeed, for the record, a kart is a minimalist vehicle, not having, for reasons of cost as well as weight and complexity, electronic means of assistance as may exist in motor vehicles.

These two constraints led the person skilled in the art to consider that it was not possible, in practice, to propose solutions allowing a driver to interact with other (real or virtual) karts and/or other elements in a playful and safe manner, at an acceptable cost.

Figure 1:
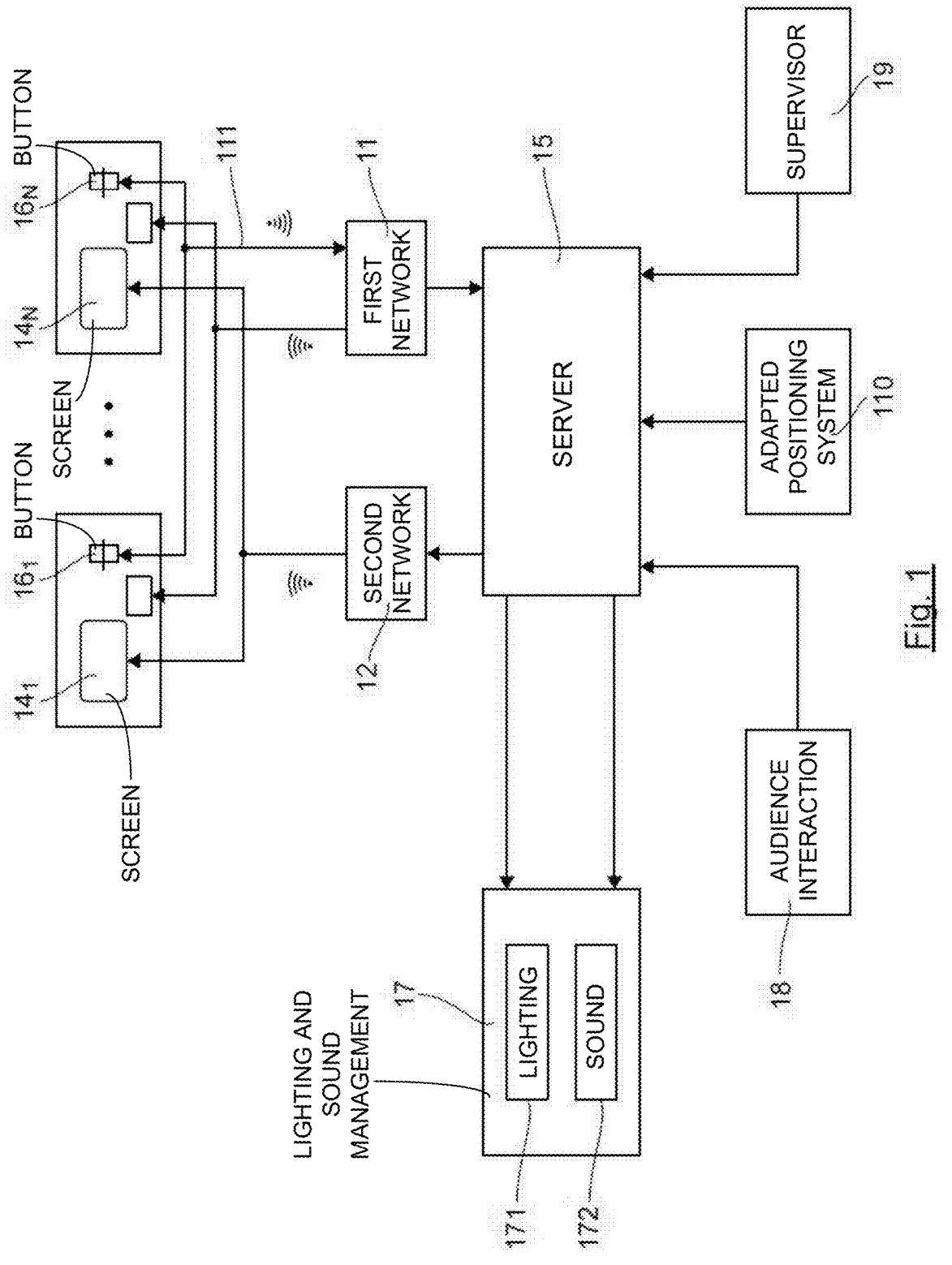
FIG. 1 is a schematic view of the communication and data exchange networks implemented according to a first approach to the invention.

According to the invention however, as illustrated in FIG. 1, this is made possible by differentiating the communication networks, so that the safety commands are transmitted by a dedicated radio network 11, used on two separate frequency bands, and that the information relating to the gaming aspects is transmitted by another channel 12, implementing a Wi-Fi protocol allowing the implementation of means available on the market, and not requiring specific development of hardware and software, for the transmission.

In summary, in the embodiment described below, said server communicates with each of said karts using at least two separate communication networks, a first safety information management network, allowing to transmit commands acting on the control of the motorisation of at least one kart according to a secure radio protocol, on a first frequency of the ISM band, and a second gaming information management network, allowing to transmit image data to a screen mounted on the steering wheel each of said karts according to a Wi-Fi protocol, said first network also allowing the transmission, on a second frequency of the ISM band, of requests for action from one of said karts to said server, including at least requests for a temporary increase in the power of said kart and requests for a temporary reduction of the power of another kart.

Said server comprises means for managing the respective positions of each of the karts, provided by said locating means, and means for analysing said requests according to said respective positions, able to validate, refuse, modify and/or delay the activation of said requests, by emitting corresponding commands to the concerned karts, via said first network, and synchronisation means controlling according to said requests:

means for generating image data at least to said concerned karts, illustrating the activation of said requests, via said second network; and means for generating special effects, controlling light and/or sound means provided for this purpose on said karting track, to simulate the activation of said requests.

Thus, according to the invention, it is possible to offer improvements, or enhancements, which are fun, compared to the usual practice of karting, without compromising safety. Specific means, including a dedicated network, are provided to generate and transmit commands to stop or slow down certain karts. In parallel, the server produces images, or information allowing to construct images, which are reproduced on screens mounted on the steering wheel of the karts. Transmission is provided by a second Wi-Fi network which does not interfere with the transmission of safety information.

This Wi-Fi network allows simple and efficient transmission, adapted to the mobile screens equipping the steering wheels.

The server also provides, in a synchronised manner, special effects, which can in particular be actuated via data delivered by the second network.

It is important to note that, for a gaming, but also sporty implementation, the speed variations should preferably be significant (at least 10 km/h). This requires an implementation guaranteeing the safety of the drivers, by a precise analysis and a very efficient transmission of the commands by the first network. In this embodiment in particular, it is planned to equip the karts, at their steering wheel, with a screen and transmission/reception means in the form of a smartphone $14_1$ to $14_N$ (for a fleet of N karts) or a tablet. Such a device, for example according to the Android technique (registered trademark) has Wi-Fi communication means and a screen. It is therefore only necessary to develop an adapted application, capable of receiving information from the server 15, for example information on possible actions or effects undergone, points gained or lost, classification, etc.

The kart, in particular the steering wheel, can be equipped with one or more buttons $16_1$ to $16_N$, allowing the transmission of a (virtual) shooting command to another kart to slow it down or an activation of a "boost" or "turbo" effect, conferring a temporary increase in electric power, for example, in the case of an electric kart.

Preferably, these commands are not transmitted by the Wi-Fi network 12 (for example via a command accessible by pressing the screen of the telephone 14), but by a button 16 transmitting via the first network 11, over a first dedicated wavelength 111. Indeed, these actions inducing an acceleration or slowing down of one or more karts, are likely to create dangerous situations (accidents between two or more karts, going off the track in a turn, etc.) and must therefore be managed in a safe and immediate manner. They will therefore be transmitted by the network 11, which is a priority network, with Wi-Fi network 12 remaining dedicated to gaming and enhancement aspects, which can tolerate a slight delay, or even a transmission fault.

The network 11 is preferably a secure network using the ISM bands, which are free in particular in France. In particular, the first wavelength belongs to the low ISM band, for example 433 MHz and the second wavelength belongs to the high ISM band, for example 868 MHz. The signals are transmitted in a safe manner, if necessary with redundancy, error correcting codes, encryption, etc.

The Wi-Fi 12 network can also be used to communicate with other elements participating in gaming enhancement, and in particular:

the reproduction of a virtual image of the entire track, on one or more large screens 16, allowing the audience to follow the position of the different karts (for example in the form of avatars) and the game effects (slowed or accelerated kart, virtual elements on the track, on which it is necessary to run or which must, on the contrary, be avoided, etc.);

the management of lighting means 171 and sound reproduction 172 ("sounds and lights") 17, for example allowing to light and follow a kart to illustrate that it is the victim of a slowdown (red lighting for example) or beneficiary of a "boost" effect (green lighting for example). Sound effects, depending on the karts thanks to loudspeakers distributed on the track, are also possible. Visual and/or sound effects can also be implemented to illustrate an effect on a zone of the track, generated randomly, or following an action by the driver of a kart, by a person in charge of animation, audience;

the management of means 18 of interaction of the audience, outside the karts, for example to interact with one or more karts, by participating virtually in the competition from a virtual cockpit, or by aiming virtually on a kart using a fake weapon (the line of sight of which is measured and transmitted to the server, as well as the actuation of a shooting).

The server can also receive information or commands from a supervisor 19, in particular for safety applications: the latter can in particular send an order to slow down, or even stop, to one or more karts whose behaviour is dangerous and/or is/are in a danger zone (in some cases this can also be determined by the server itself, after analysing the positions, trajectory and/or speed of a kart).

Figure 2:
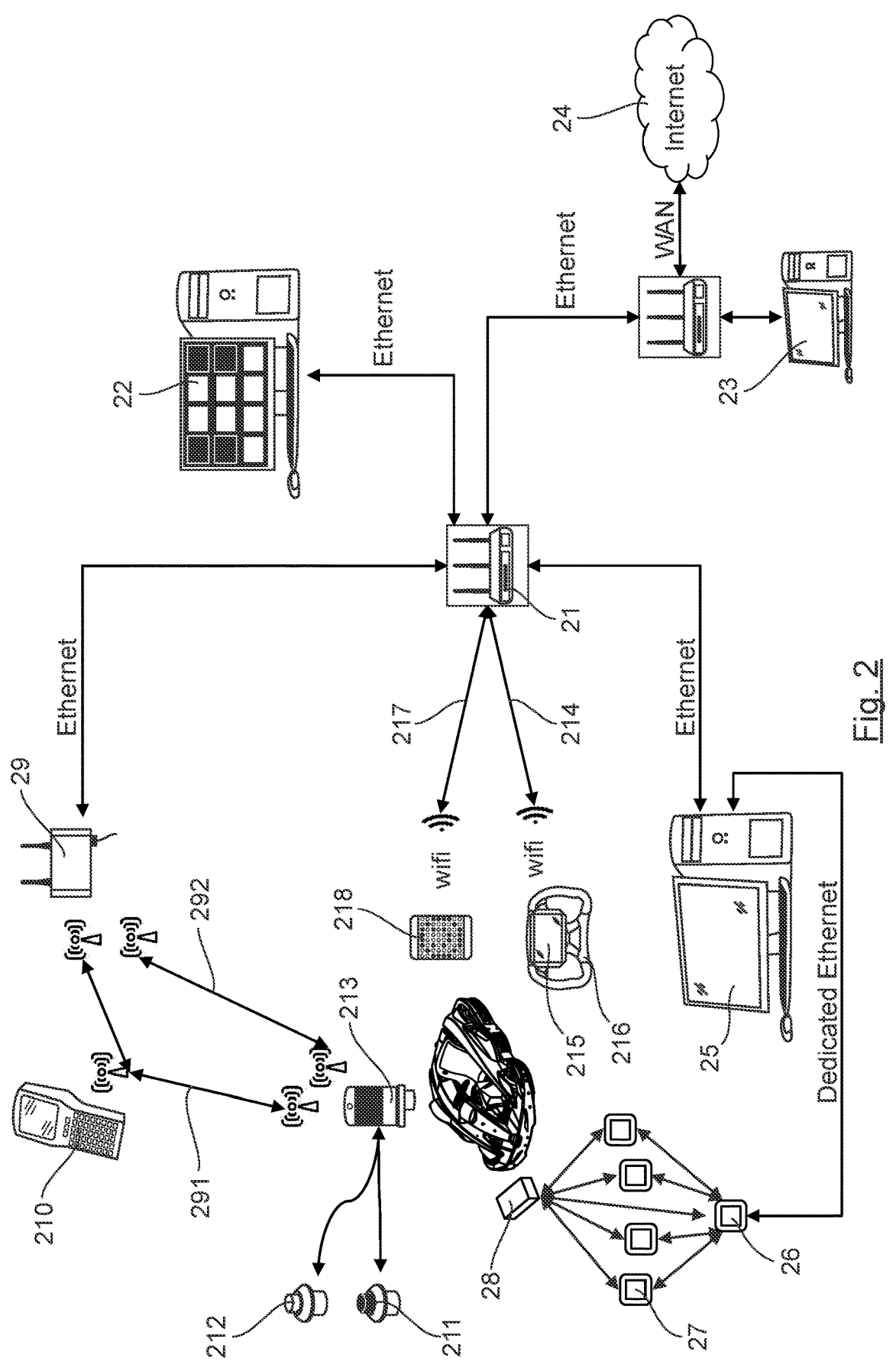
FIG. 2 shows a more detailed view of an embodiment of the system of FIG. 1.

The server 15 also has the precise positions of each of the karts on the track, via an adapted positioning system 110, for example using means distributed on the track and/or carried by the kart and/or the driver's headset (in particular in the embodiment implementing virtual reality, described below). A more detailed example of implementation is illustrated in FIG. 2.

A communication node 21 connects, for example by Ethernet, several computers:

a gaming server 22, controlling the various gaming aspects;

a server 23 for managing and displaying times and/or places, which can be connected to the Internet network 24;

a positioning server 25, connected to a master antenna 26 which communicates with a plurality of antennas 27 distributed along the track and which receive the signals emitted by tags 28 carried by each of the karts. The positioning server can in particular operate at ultra-high frequency (UWB or "Ultra Wide Band", between 3 and 10 GHz).

The communication node 21 distributes the safety signals to a safety management device 29, which emits them immediately, via the first wavelength 291 of the dedicated radio network. Safety commands can also be provided via a remote control 210 held by a supervisor, to act immediately on one or more karts, in the event of danger.

The controls equipping the kart steering wheel comprise in particular a "boost" button 211 and a "shooting" button 212, which can be actuated by the driver at his convenience. The corresponding commands are transmitted, via an analogue/digital converter (ADC) and a transponder 213 carried by the kart, communicating via the second wavelength 292 of the dedicated radio network.

The access point 21 also ensures the transmission of Wi-Fi information (either directly or through a dedicated device, not shown). This information comprises in particular information 214 intended to be displayed on the screen 215 carried by the steering wheel 216 of each kart. According to one embodiment, information 217 is also transmitted to a display element 218, for example a LED screen, mounted at the rear of the kart to communicate with the karts which follow it (for example to confirm that a shot hit the mark, or that the kart is currently or soon in an accelerated or slowed mode).

The server 22 can also take into account actions performed by the audience, who can for example vote to choose their favourite and provide it with a "bonus", or on the contrary penalise a competitor with a "penalty", or choose to display a virtual element in front of a driver and/or a predetermined (or randomly chosen) location of the track. The server sends corresponding information to the screen 215, which visually returns it to the driver. Depending on the case, a more or less significant part of the processing is carried out by the server or by the associated processing means (for example in a smartphone) on the screen 215, according to their capacities.

At the same time, the server 22 controls the visual and/or sound effects, as illustrated for example in the embodiment of FIG. 3. In particular, it controls lighting 31 and loudspeakers 32 distributed around and/or above the track. Depending on the effects, the lights and/or sounds can be oriented on a zone of the track, where appropriate in the form of holograms, to define a virtual object, or follow a kart, to signal to everyone that it is benefiting from a bonus (and therefore for example that it moves faster) or a penalty (and therefore for example that it moves more slowly).

The application of a "bonus" or a "penalty", proposed by a spectator, or a group of spectators, or made available randomly via the server, or according to the behaviour of the driver (safety and/or passage on a virtual object) can for example be counted in the form of points (the driver must earn a maximum of points), time (added or subtracted from his time, so as to be able to modify his classification or, where appropriate, providing additional time on the track, etc.). According to another approach, or in combination, the "bonus" and the "penalty" can act on the available power of the motor, in particular on electric motors.

As illustrated by the example of FIG. 4, the steering wheel 41 of the kart carries the screen 42 and at least two buttons, a "boost" (turbo) button 43 and a shooting button 44. The gaming aspects can be illustrated in a simplified manner on the screen 42, for example:

a rocket 421 to illustrate an acceleration effect for a predetermined period of time (the count of which may also appear on the screen), when the driver has pressed on the button 43 and the safety conditions have been validated;

a shield 422 to illustrate protection (immunity) against a shooting or attack from another kart or the audience;

a missile 423, offering the possibility of shooting using the button 44 (a similar image, for example on a red background, can warn the driver that he himself has been struck by such a missile);

a flash 424, giving the driver the possibility of acting ("striking") on all his competitors, to slow them down;

an accumulation of points 425;

etc.

In a particular embodiment, the shooting button can be supplemented or replaced by a fake weapon, which is movable to allow the driver (or an accompanying person, in a two-seater kart), to aim at another kart. In this case, the shooting information also comprises shooting attitude data, allowing the server to determine whether or not the shooting was successful.

5.2 Safety Management

It is important to note that the approach of the invention differs from that of video games not only by the implementation of adapted transmissions, using several communication networks and a need for real and precise localisation of the karts, but also because of the need to ensure the safety of the drivers and to avoid, as far as possible, incidents or accidents.

Furthermore, as illustrated in FIG. 4, the gaming approach increases the risks, due to the possible large variations in the speed of the karts, induced by the effects of acceleration, deceleration or other.

In a conventional operation 41, four speeds can be defined:

V1 "stand": for example 10 km/h;

V2 "child": for example 20 km/h;

V3 "operation": for example 35 km/h;

V4 "expert": for example 45 km/h.

The differences between these speeds are relatively small, and above all, these speeds are dedicated to zones (stands) and/or to types of users (children, experts, etc.) and apply uniformly to all karts: the speed is not changed during operation.

On the other hand, in the gaming exploitation 42 of the invention, there are at least three types of speeds:

V1 "slow down": for example 10 km/h;

V2 "operation": for example 30 km/h;

V3 "boost": for example 45 km/h.

The speed differences 421, 422 between the three situations are therefore significant (for example between V1=10 km/h and V3=45 km/h). This is desirable, in order to "feel" the effects of actions. But this introduces risks, in particular as the speeds are not applied globally, to the entire kart fleet, but specifically to a kart. For example, it is possible that one of the karts has a speed V3 while the one in front of it is slowed down to speed V1. Furthermore, speed changes can be made at any time, without warning (for example by decision of a driver or the audience) and on a single kart. The risk of contact or even accidents is therefore high.

According to an important aspect of the invention, provision is therefore made to avoid, or at the very least greatly reduce, this risk.

For this purpose, the server implements a control of the gaming aspects which can in particular authorise, prohibit, modulate and/or delay the application of a "bonus" or "penalty". Indeed, it may be desirable that a "turbo" effect obtained by a driver, and actuated by the latter, for example via the button present on his steering wheel or a voice command, is not applied immediately, for example if this driver is in a turn, or a slower kart is just in front of him.

The same can be done for a "penalty" effect, which would be sent by a spectator or another kart: the kart must not slow down sharply in a turn, and/or when it is closely followed by another kart, in particular if it benefits from the acceleration effect.

The server can therefore control the application of these effects, which results, for example, in an increase or a reduction in power, as needed. Likewise, the server can decide on specific actions on its own, for safety reasons.

This essential aspect is far from video games, wherein accidents are part of the very principle of the game. According to the invention, the actions, in particular the actions leading to a significant speed variation (increase or reduction of the maximum speed for example) or another effect on a kart, is subject to an authorisation, and if necessary an adaptation (modulation, delay, etc.), delivered by the server. And this authorisation and/or adaptation is delivered via the first network dedicated to safety, which guarantees secure and immediate transmission.

This can for example be implemented according to the method of the invention, an example of which is illustrated in FIG. 6.

The server receives (61) a game command 611, for example a "boost" request or a shooting, via the first network.

Then it takes into account (62) the position of the concerned kart(s), as well as nearby karts, according to the positioning data 621. It also determines (63) various information, such as, for example, the speed of each kart, its acceleration, the differences between the karts, etc.

It also takes into account (64) the position of the karts on the track, because the decisions are different depending on whether the kart is in a straight line or in a curve or a turn. It can also take into account the trajectory (is the kart on a good trajectory? Is it oriented correctly in relation to the track?, etc.). Where appropriate, it can also receive data relating to the driver, for example provided by a database 651. Indeed, according to his experience, and/or his previous behaviour, the decisions can be adapted. Based on all this information, a decision is made (66) on the application of the command received, for example according to a rule base 661, controlled by a computer program, for example implementing an artificial intelligence (gradually allowing decisions to be optimised based on experience). This decision can take into account reference data 662, corresponding to the behaviour of a "reference" kart, which is pre-recorded, allowing to know, for example, the best trajectory, the maximum speeds in the different zones, the times and intensity of braking, etc.

These decisions lead to the transmission (68) of an action, if the decision is favourable, for example to act on the engine power (acceleration or slowdown) via the first network, as well as to the transmission (67) of information via the second network to the screens mounted on the steering wheels, to inform the drivers. Finally, the information is also delivered (69) by means of sound and light.

When, in step 66, the server considers that there is a dangerous situation, it can adapt its decision in several ways:

refusal, or cancellation, of the command;
  postponement of the command (which will be applicable a few seconds later and/or when the kart is in another position on the track);
  modification, or modulation, of the command (the slowing down or acceleration may be weaker, or gradual);
  etc.

In these different situations, information 67 is transmitted, so that the driver is informed. Likewise, the light and sound effects 69 can be adapted.

The server 15 comprises means for synchronising the various aspects, in particular the application of the command via the first network, adapted if necessary as described above, and consequently image elements transmitted to the corresponding kart(s) and sound and light effects. This synchronisation primarily takes into account the aspects relating to safety, then adapts the gaming aspects accordingly.

5.3 Variant of Implementation

According to a second approach illustrated by FIG. 7, the drivers are placed in a virtual reality situation. In this case, they are equipped with a virtual reality headset 71. Therefore, they no longer distinguish the real track, and it is possible to place them in a "virtual world", built by the server.

In this case, the headset can determine its position itself, eliminating the need for an exchange with a positioning server. The positioning information is transmitted to the server, preferably via the first network. The other aspects described above may also apply.

In particular, it is understood that the aspects relating to safety are similar, if not increased. It could also be considered to systematically lower the speeds, compared to the previous embodiment.

5.4 Other Optional Aspects

Many variations can of course be considered. For example:

the driver himself can interact with the other karts, for example via a virtual shot, visible in the visor (and if necessary in a real way, using a laser beam), for example to slow down the driver in front of him (this action, authorised for example after having passed over a corresponding object which may temporarily limit the power of the targeted kart);

the shooting can be undifferentiated (it is directed towards the nearest preceding kart) or implement an aim;

the shooting can be single or multiple (receiving several shots amplifying the effect, for example slowing down);

the attitude of the shooting can be that of the kart, or that of a viewing instrument simulating a weapon (for example on a two-seater kart);

various interactions with the audience are possible: the audience can themselves have fake weapons, designate a driver to benefit from a bonus or a penalty, participate in parallel and virtually in the race, via a screen and a kart simulator, etc.

in addition to the electrical power, it may be possible to act on other mechanical elements of the kart (reduction of the stroke of the accelerator pedal, blocking of one of the wheels to force a spin, etc.);

etc.

The invention claimed is:

1. A system for controlling a plurality of karts distributed over a karting track, the system comprising:

a control server configured to receive a position of each kart of said plurality of karts from a positioning system and to communicate with each kart of said plurality of karts using at least two separate communication networks including a first safety information management network configured to allow the control server to transmit commands to control motorization of at least one kart of said plurality of karts according to a first secure radio protocol, and a second gaming information management network configured to allow the control server to transmit image data to a screen mounted on each kart of said plurality of karts according to a second protocol, and wherein said control server being configured to:

manage respective positions of each of said plurality of karts provided by said positioning system, and analyze action requests emitted by said plurality of karts for increasing and/or reducing power according to said respective positions, validate, refuse, modify and/or delay activation of said action requests by emitting corresponding commands to the respective karts corresponding to the action requests via said first network, synchronize the activation of the action requests according to said action requests, generate image data for each of said action requests illustrating the activation of said action request, and transmit the image data to at least one of the karts via said second network, wherein at least one of the karts comprises a steering wheel, and the screen is mounted on the steering wheel and is configured to reproduce said image data transmitted via said second network to illustrate the activation of said action request.

2. The system according to claim 1, wherein the system comprises the positioning system, which implements a third communication network with said control server, implementing an Ultra-Wide Band communication.

3. The system according to claim 1, wherein said first protocol implements a communication on a first frequency of an Industrial, Scientific and Medical (ISM) band.

4. The system according to claim 3, wherein said action requests are transmitted via said first network, and said first network also allows transmission, on a second frequency of the ISM band.

5. The system according to claim 1, wherein said screen being a removable screen in the form of a smartphone.

6. The system according to claim 1, wherein said server is also configured to generate special effects through the control of light and/or sound devices provided on said karting track, to simulate the activation of said action requests.

7. The system according to claim 1, wherein for at least one of the requests, said server is configured to validate, refuse, modify and/or delay the activation of the action request according to a plurality of criteria comprising:

the position of said kart of said plurality of karts, emitting the action request and/or of a neighboring kart of said kart of the plurality of karts, emitting the action request, on said track, so as to avoid a change in power in a dangerous zone of said track;

the position of said kart of said plurality of karts, emitting the action request and/or said neighboring kart of said kart of said plurality of karts, emitting the action request, relative to all nearby karts of the plurality of karts;

an orientation, speed and/or acceleration of said kart of said plurality of karts, emitting the action request and/or said neighboring kart of the plurality of karts, emitting the action request, relative to said track;

the orientation, speed and/or acceleration of said kart of the plurality of karts, emitting the action request and/or said neighboring kart of the plurality of karts, emitting the action request, in relation to all the nearby karts of said plurality of karts;

information on a possibility of activating said action request, according to a set of rules for loading an availability counter.

8. The system according to claim 7, wherein said server also takes into account orientation, speed and/or reference acceleration, pre-recorded by said control server.

9. The system according to claim 1, wherein said action requests comprise at least a request for a temporary increase in power of said kart of said plurality of karts emitting the request for the temporary increase in power and a request for a temporary reduction of power of another kart of said plurality of karts.

10. The system according to claim 9, wherein said request for a temporary reduction of the power of one kart of said plurality of karts, corresponds to sending a fictitious missile by said kart emitting the request, the sending and/or an impact of which are illustrated by said server.

11. The system according to claim 10, wherein said control server applies said impact to one kart of said plurality of karts that precedes and is closest to one kart of said plurality of karts, emitting the request.

12. The system according to claim 10, wherein said server determines a trajectory of said fictitious missile depending on the position and orientation of said kart of said plurality of karts emitting the request and an existence or not of an impact on one kart of said plurality of karts, preceding said kart of said plurality of karts, emitting the request, depending on the position, orientation, speed and/or distance of said preceding kart of said plurality of karts.

13. The system according to claim 12, wherein the system comprises one kart of said plurality of karts emitting the action request and said kart of said plurality of karts, emitting the action request comprises buttons and/or screens for modifying an attitude of a missile strike, relative to the orientation of said kart of said plurality of karts emitting the action request.

14. The system according to claim 13, wherein said kart of said plurality of karts emitting the action request is a two-seater kart, configured for carrying a driver and a passenger, said buttons and/or screens for modifying the attitude of a missile strike being positioned on the kart of said plurality of karts emitting the action request so as to be manipulated by said passenger.

15. The system according to claim 10, wherein said control server varies an intensity of the impact according to a number of successive requests generated by said kart of said plurality of karts emitting the action request within a predetermined period of time.

16. The system according to claim 1, wherein the system further comprises a virtual reality device wearable by a driver of at least one kart of said plurality of karts, wherein the virtual reality device is supplied via said second gaming information management network.

17. The system according to claim 16, wherein said virtual reality device is configured to locate the corresponding kart of said plurality of karts, cooperating with tags carried by each kart of said plurality of karts for transmitting location information via said second gaming information management network.

18. The system according to claim 1, wherein said server is also configured to permit at least one of the following:

construct a virtual image of said track, and transmit said virtual image to at least one screen intended for spectators or players; and allow a spectator to emit requests able to act on at least one kart of said plurality of karts.

19. A method for managing a system controlling a plurality of karts distributed over a karting track, the method comprising the following acts in a management server:

determining a respective position of each kart of said plurality of karts;

communicate with each kart of said plurality of karts using at least two separate communication networks including a first safety information management network and a second gaming information management network;

emitting commands to control motorization of at least one kart of said plurality of karts via said first safety information management network implementing a secure radio protocol;

receiving action requests for action from at least one kart of said plurality of karts, said action requests including at least a request for a temporary increase in a power of said kart of said plurality of karts emitting the request for the temporary increase in power and a request for a temporary reduction of a power of another kart of said plurality of karts;

analyzing said action requests according to said respective positions, so as to validate, refuse, modify and/or delay activation of said action requests;

for at least one of the action requests emitting a command corresponding to said activation which is validated, refused, modified and/or delayed to at least one kart of said plurality of karts that corresponds to the action request, via said first network;

generating image data, illustrating the activation of said action requests;

emitting said image data via said second network; and displaying said image data on a steering wheel mounted screen of the at least one kart of said plurality of karts.

20. A system for controlling a plurality of karts distributed over a karting track, the system comprising:

a control server configured to receive a position of each kart of said plurality of karts from a positioning system and to communicate with each kart of said plurality of karts using at least two separate communication networks including a first safety information management network configured to allow the control server to transmit commands to control motorization of at least one kart of said plurality of karts according to a first secure radio protocol, and a second gaming information management network configured to allow the control server to transmit image data to a screen mounted on each kart of said plurality of karts according to a second protocol, and wherein said control server being configured to:

manage respective positions of each of said plurality of karts provided by said positioning system, and analyze action requests emitted by said plurality of karts for increasing and/or reducing power according to said respective positions, validate, refuse, modify and/or delay activation of said action requests by emitting corresponding commands to the respective karts corresponding to the action requests via said first network, synchronize the activation of the action requests according to said action requests, generate image data for each of said action requests illustrating the activation of said action request, and transmit the image data to at least one of the karts via said second network, wherein:

said action requests comprise at least a request for a temporary increase in power of said kart of said plurality of karts emitting the request for the temporary increase in power and a request for a temporary reduction of power of another kart of said plurality of karts;

said request for a temporary reduction of the power of one kart of said plurality of karts, corresponds to sending a fictitious missile by said kart emitting the request, the sending and/or an impact of which are illustrated by said server;

said server determines a trajectory of said fictitious missile depending on the position and orientation of said kart of said plurality of karts emitting the request and an existence or not of an impact on one kart of said plurality of karts, preceding said kart of said plurality of karts, emitting the request, depending on the position, orientation, speed and/or distance of said preceding kart of said plurality of karts;

the system comprises one kart of said plurality of karts emitting the action request and said kart of said plurality of karts, emitting the action request comprises buttons and/or screens for modifying an attitude of a missile strike, relative to the orientation of said kart of said plurality of karts emitting the action request; and said kart of said plurality of karts emitting the action request is a two-seater kart, configured for carrying a driver and a passenger, said buttons and/or screens for modifying the attitude of a missile strike being positioned on the kart of said plurality of karts emitting the action request so as to be manipulated by said passenger.

21. A system for controlling a plurality of karts distributed over a karting track, the system comprising:

a control server configured to receive a position of each kart of said plurality of karts from a positioning system and to communicate with each kart of said plurality of karts using at least two separate communication networks including a first safety information management network configured to allow the control server to transmit commands to control motorization of at least one kart of said plurality of karts according to a first secure radio protocol, and a second gaming information management network configured to allow the control server to transmit image data to a screen mounted on each kart of said plurality of karts according to a second protocol, and wherein said control server being configured to:

manage respective positions of each of said plurality of karts provided by said positioning system, and analyze action requests emitted by said plurality of karts for increasing and/or reducing power according to said respective positions, validate, refuse, modify and/or delay activation of said action requests by emitting corresponding commands to the respective karts corresponding to the action requests via said first network, synchronize the activation of the action requests according to said action requests, generate image data for each of said action requests illustrating the activation of said action request, and transmit the image data to at least one of the karts via said second network, wherein:

said action requests comprise at least a request for a temporary increase in power of said kart of said plurality of karts emitting the request for the temporary increase in power and a request for a temporary reduction of power of another kart of said plurality of karts;

said request for a temporary reduction of the power of one kart of said plurality of karts, corresponds to sending a fictitious missile by said kart emitting the request, the sending and/or an impact of which are illustrated by said server; and said control server varies an intensity of the impact according to a number of successive requests generated by said kart of said plurality of karts emitting the action request within a predetermined period of time.

\* \* \* \* \*